(12) United States Patent
Covington

(10) Patent No.: US 6,616,836 B1
(45) Date of Patent: *Sep. 9, 2003

(54) FILTER ELEMENT FOR OIL PANS AND FILTER ELEMENT/OIL PAN COMBINATION

(75) Inventor: Edward Allen Covington, Gastonia, NC (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,625

(22) Filed: Jul. 29, 1997

(51) Int. Cl.$^7$ .............................................. B01D 35/027
(52) U.S. Cl. ...................... 210/172; 210/168; 210/450; 210/452; 210/493.2; 210/493.3
(58) Field of Search ................................ 210/168, 172, 210/445, 450, 452, 477, 493.1, 493.3, 495, 456, 474, 493.2, 451; 55/497, 511, 521; 184/106; 123/195 C, 196 A

(56) References Cited

U.S. PATENT DOCUMENTS

| 1,671,391 A | | 5/1928 | Winslow et al. | |
|---|---|---|---|---|
| 2,577,188 A | * | 12/1951 | Hall ............................ | 184/106 |
| 2,767,736 A | | 10/1956 | Lackinger | |
| 3,056,501 A | | 10/1962 | Thorman et al. | |
| 3,168,468 A | | 2/1965 | Jagdmann | |
| 3,397,518 A | * | 8/1968 | Rogers ......................... | 56/497 |
| 4,136,011 A | | 1/1979 | Joseph et al. | |
| 4,352,737 A | | 10/1982 | Taniguchi | |
| 4,507,203 A | * | 3/1985 | Johnston ...................... | 210/450 |
| 4,521,309 A | * | 6/1985 | Pall ........................... | 210/493.2 |
| 4,995,971 A | | 2/1991 | Droste et al. | |

FOREIGN PATENT DOCUMENTS

| DE | 3822443 | * | 3/1989 | .............. 210/493.3 |
|---|---|---|---|---|
| EP | 07126521 A1 | | 5/1996 | |
| GB | 474167 | * | 10/1937 | .................. 210/452 |
| JP | 56-45643 | * | 10/1981 | .............. 210/493.1 |

* cited by examiner

Primary Examiner—Matthew O. Savage
(74) Attorney, Agent, or Firm—Millen, White, Zelano & Branigan, P.C.

(57) ABSTRACT

A filter/oil pan assembly for use in devices such as transmissions for vehicles and for use as oil pans in internal combustion engines includes a housing having an upper chamber and a sump, wherein a filter element is disposed between the upper chamber and the sump. The filter element includes a filter media having pleats which extend in the direction parallel to the direction of movement of the vehicle utilizing the filter element. In order to facilitate flow through the filter element, all interior surfaces of the housing slope toward a well in which the filter element is positioned and the filter element itself has laterally projecting flanges which slope downwardly toward the filter media.

35 Claims, 4 Drawing Sheets

FILTER ELEMENT FOR OIL PANS AND FILTER ELEMENT/OIL PAN COMBINATION

FIELD OF THE INVENTION

The present invention relates to filter elements for oil pans and to filter element/oil pan combinations. More particularly, the present invention relates to filter elements for use with oil pans and to a combination of filter elements and oil pans, which oil pans are useful for containing transmission fluid and lubricating oil associated with automotive vehicles.

BACKGROUND OF THE INVENTION

Automotive devices such as transmissions, both automatic and standard which use recirculating-transmission fluid, as well as internal combustion engines which use recirculating lubricating oil, filter the fluid and oil to remove particulate contaminants therefrom. In these devices, oil drains into oil pans prior to being recirculated back through the transmission or engine. In automatic transmissions, it is a practice to use a pan-type filter with a flow tube covered by a pan/tray with the tray acting as a sump for the fluid. Some sumps have a horizontal floor and others have an inclined floor. The filter life is determined by the area of the media and by utilization of the media in a way that provides good flow characteristics.

In order to decrease the cost of transmission maintenance by protecting the quality of the oil used as transmission fluid, there is a need to increase the life of the filter media, while improving efficiency and decreasing restriction thereof.

SUMMARY OF THE INVENTION

In view of the aforementioned considerations, it is a feature of the present invention to provide a new and improved filter element, wherein the filter element is configured for use in an oil pan useful in devices such as transmissions and internal combustion engines.

The invention is directed to a filter element used in a housing; wherein the filter element comprises a pleated filter media folded to provide upstream and downstream peaks having troughs therebetween, and wherein the filter media is mounted in a frame having side plate portions for sealing the ends of the troughs and laterally extending flanges which slope toward the filter media to direct the fluid being filtered onto the filter media.

In another aspect of the invention, the aforedescribed filter element is in combination with a housing, the housing being an oil pan for transmission fluid. The housing is divided into an upper chamber and a sump with the aforedescribed filter element being disposed between the upper chamber and sump.

In still another aspect of the invention, the aforedescribed filter element is used in combination with a housing that forms an oil pan for lubricating oil of an internal combustion engine.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
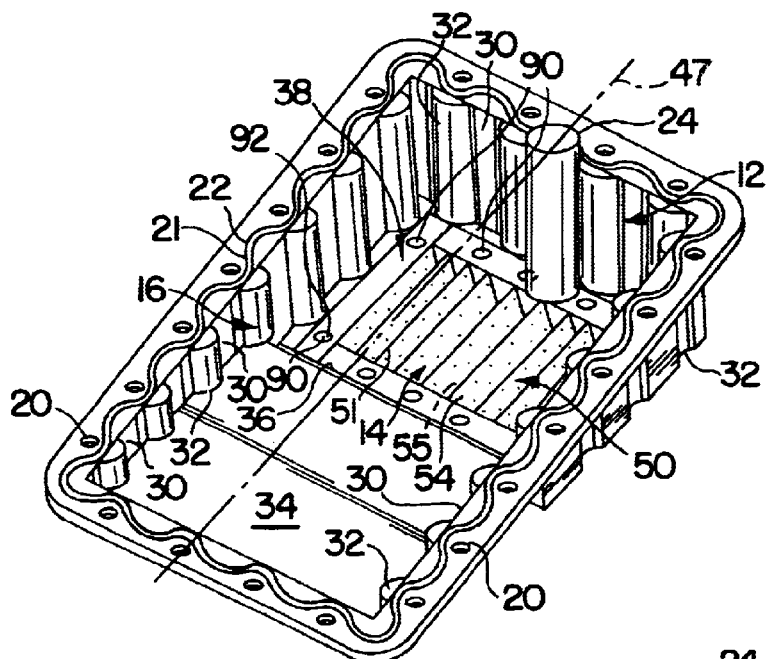
FIG. 1 is a top perspective view of an oil pan and filter configuration constructed and arranged in accordance with the principles of the present invention.
Figure 2:
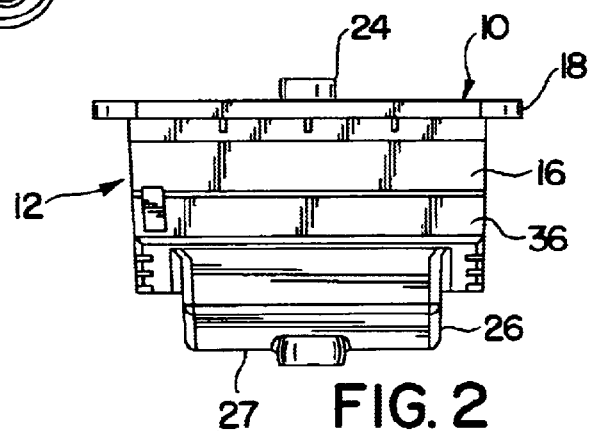
FIG. 2 is an end view of the oil pan of FIG. 1.
Figure 3:
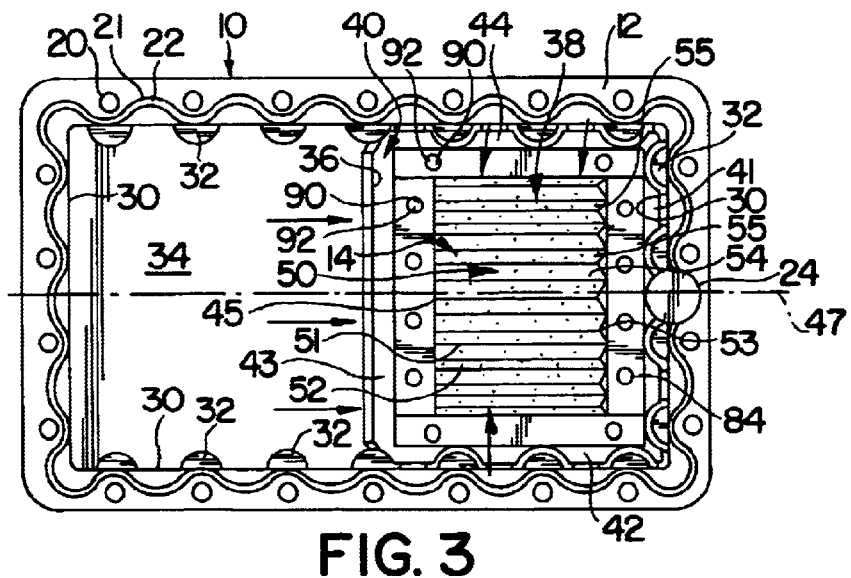
FIG. 3 is a top view of the oil pan of FIGS. 1 and 2.
Figure 4:
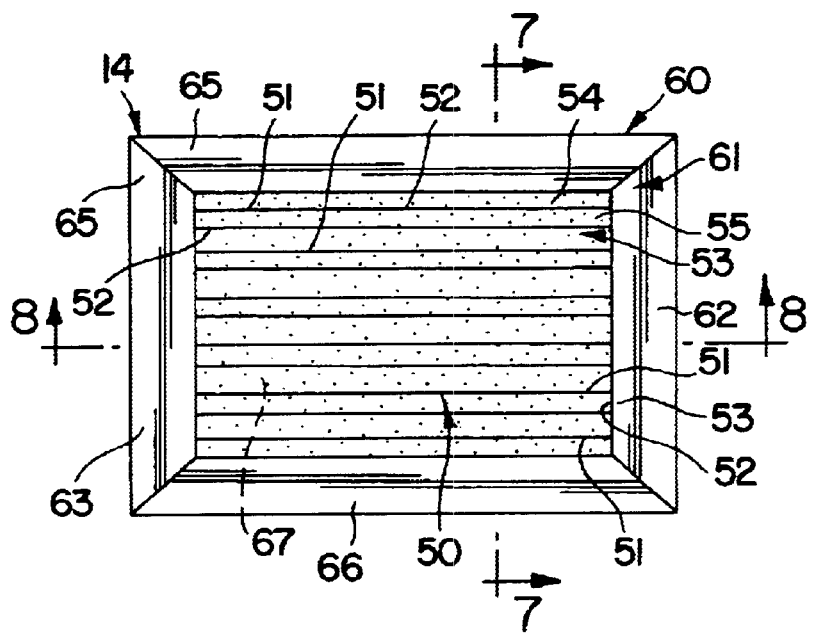
FIG. 4 is a top view of a filter element used with the oil pan of FIGS. 1–3.

Referring now to FIGS. 1–3, there is shown an oil pan/filter assembly 10 configured in accordance with the principles of the present invention, wherein the oil pan/filter assembly includes a housing 12 and a filter element 14. The assembly 10 of FIG. 1 is configured for use with an automatic transmission; however, the same general arrangement is useable with standard transmissions, semi-automatic transmissions and any transmission where recirculated transmission fluid or oil is utilized. In addition, the housing 12 has use as an oil pan with an integral filter 14 used as an oil pan/filter assembly for internal combustion engines.

The housing 12 comprises an upper chamber 16 having a laterally projecting mounting flange 18 disposed therearound. The laterally projecting mounting flange 18 has a plurality of bolt holes 20 therein for securing the housing to the bottom of an automatic transmission housing (not shown). A groove 21 is formed in the flange 18, the groove having a gasket 22 received therein for sealing with the transmission housing (not shown). In operation, oil enters the upper chamber 16 through an inlet (not shown) and is recirculated by a return pipe 24 after passing through the filter 14 which separates the upper chamber 16 from a sump 26 having a base 27 beneath which the return pipe 24 is connected. The return pipe 24 has the inlet of a suction pump (not shown) connected to the top thereof for pulling the filtered fluid from the sump 26 of the pan for recirculation back through the transmission (not shown).

The housing 16 has substantially vertical side walls 30 which include reinforcing ribs 32. A floor 34 in the upper chamber 16 of the housing 12 slopes toward the filter element 14 and the sump 26, so that all of the fluid within the upper chamber 16 is directed by the interior surfaces of the upper chamber toward the filter element and the sump 26. The sloping floor 34 terminates at an abrupt, substantially vertical wall 36 which forms a well portion 38 of the upper chamber 16, in which well portion the filter element 14 is seated. The seat for the filter element 14 is a land 40 which has four sloping surfaces 41, 42, 43 and 44 which provide a rim which slopes toward the sump 26 and provide supporting surfaces for the filter 14, as well as defining an entrance 45 from the upper chamber 16 of the housing 12 to the sump 26.

The housing 12 has an axis 47 for mounting the oil pan/filter assembly 10 so that the axis is aligned with the direction of motion of the vehicle (not shown) on which the assembly is mounted. As is seen in FIGS. 1 and 3, the filter 14 has a pleated filter media 50 having upstream peaks and downstream peaks 51 and 52, respectively, which define peaks and valleys respectively creating troughs 53 which extend parallel to the axis 47. The sides 54 and 55 define panels of each trough 53 therefore act as dams to keep fluid in the troughs from shifting from one side of the filter element 14 to the other due to centrifical force as the vehicle turns the peaks 52 all substantially lie in the same plan 52a and the valleys 53 all substantially lie in the same plane 53a (see FIG. 5).

Referring now to FIGS. 4–8, it is seen that the filter media 50 is rectangular and is mounted in a moanting frame 60, wherein the moanting frame includes a laterally extending flange arrangement 61 having front and rear lateral flanges 62 and 63, respectively, and side lateral flanges 65 and 66. The lateral flanges 62–66 each have upper surfaces which slope downwardly toward the filter media 50 and are disposed above an inlet face 67 of the filter media 50, which is defined by the plane which includes the upstream peaks 51 of the filter media pleats (an outlet face 68 being defined by the plane which includes the downstream peaks 52). The lower surfaces of the flanges 62–66 also slope toward the filter media 50 so that when the filter element 14 is nested within the well 38 of the upper chamber 16 within the housing 12, the lower surfaces abut substantially flat against the four support surfaces 41–44 of the land 40 (see FIGS. 1 and 3).

Figure 5:
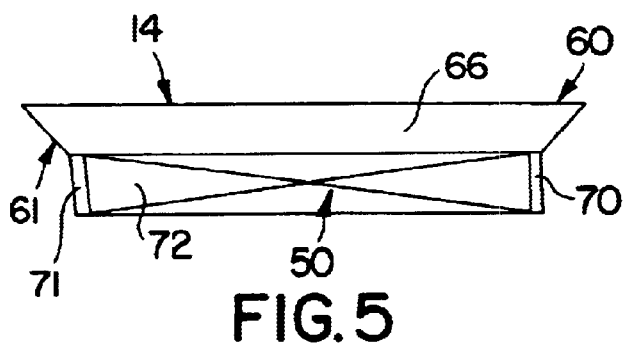
FIG. 5 is a side view of the filter element of FIG. 4, both side views being the same.
Figure 6:
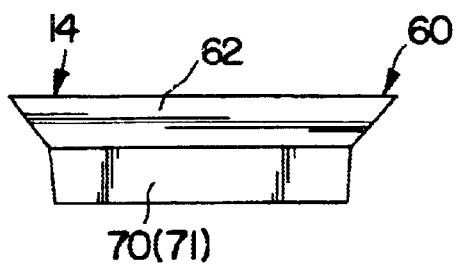
FIG. 6 is a front view of the filter element of FIG. 4, the back view being the same.
Figure 7:
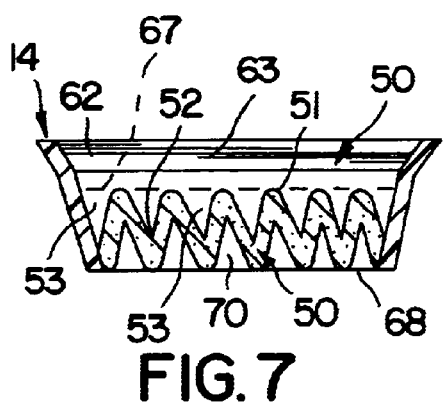
FIG. 7 is an elevation taken along lines 7—7 of FIG. 4.
Figure 8:
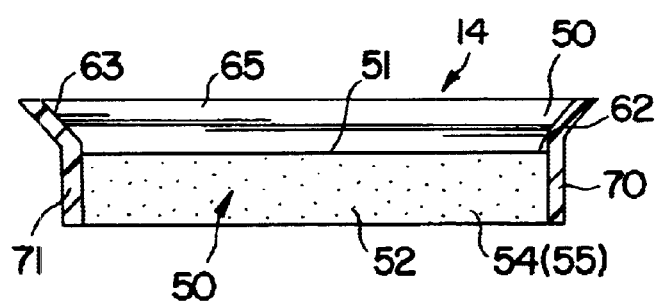
FIG. 8 is an elevation taken along lines 8—8 of FIG. 4.

It is necessary to seal the ends or terminuses of the troughs 53 and this is accomplished by a front side plate 70 and a rear side plate 71 which cover and seal the ends of the troughs, as is indicated in FIGS. 5 and 6. The side plates 70 and 71 extend downwardly from the mounting frame 60 and extend perpendicular to the horizontal extent of the peaks 51, valleys 52, and troughs 53. This keeps the oil to be filtered in the troughs 53 and prevents the oil from running out of the ends of the troughs. Preferably, the material of the filter media 50 at the ends of the troughs 53 is embedded in the nylon plates 70 and 71 by molding the plates onto the filter media 50 when forming the frame 60. There is only a need for the front and rear plates 70 and 71, since the oil being filtered flows through the outermost side panels 72 of the filter media 50; although, it may be desirable to have side plates to provide additional stiffeners for the frame 60.

Figure 9:
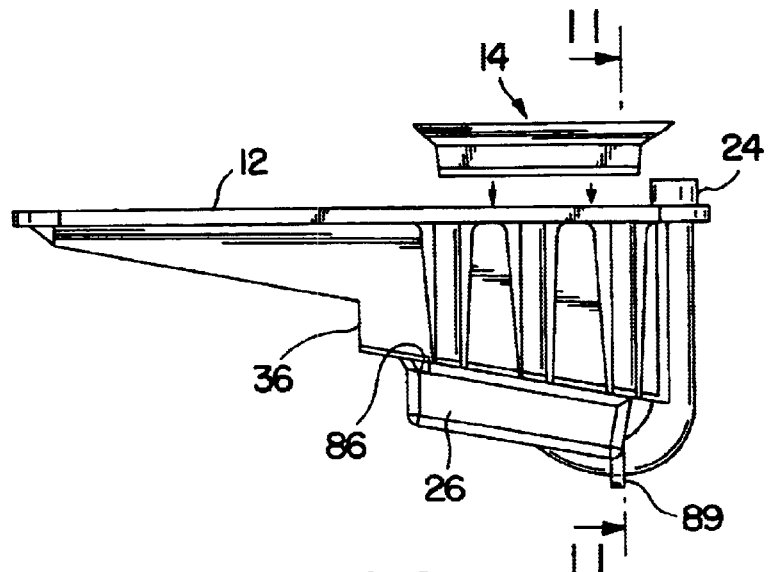
FIG. 9 is a side view showing the filter of FIGS. 4–8 being inserted into the oil pan of FIGS. 1–3.
Figure 10:
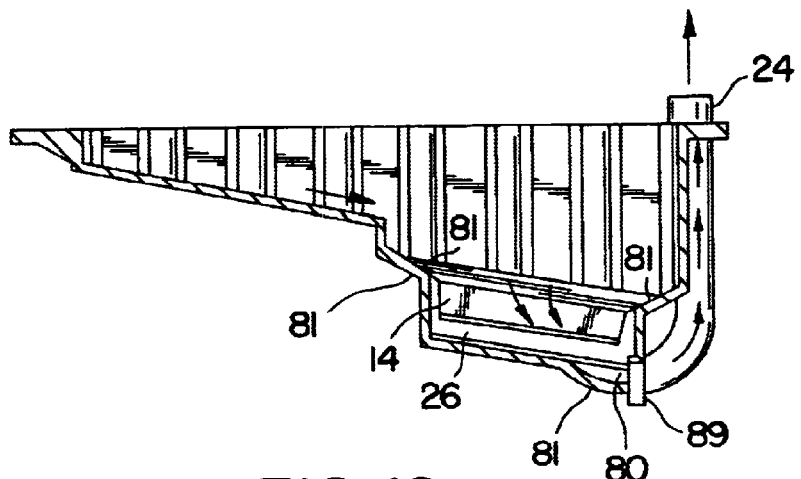
FIG. 10 is a cross-section taken along lines 10—10 of FIG. 3.
Figure 11:
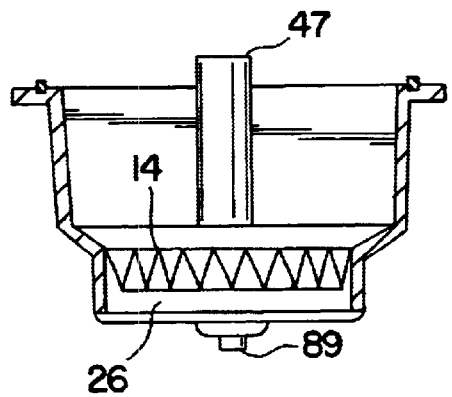
FIG. 11 is a cross-section taken along lines 11—11 of FIG. 3.

Referring now to FIGS. 9–11, it is seen in FIG. 9 that the filter element 14 is a separate component from the housing 12 and is inserted in the housing so as to nest therein, as seen in FIG. 10 (also in FIGS. 1 and 3).

As is seen in FIG. 10, the filter element 14 is mounted with the lateral flanges 62–66 abutting the sloping surfaces 41–44 of the land 40 so as to slope toward a drain area 80 of the sump 26. A gasket 81 is disposed between the land 40 and the lower surfaces of the laterally projecting flanges 62–66 of the filter element 14. In order to retain the filter element 14 in its nested position in the housing 12, the filter element 14 has a plurality of apertures 84 therein which receive post fasteners to provide a coupling arrangement to positively retain the filter element in place in the housing 12. The weight of the oil pressing down on the filter element, as well as suction applied to the return pipe 24, also serve to retain the filter element 14 seated against the land 40 of the housing 12.

If for some reason the filter element 14 becomes clogged, it is highly desirable to provide a bypass 86 so the fluid, whether the pan is a transmission oil pan or lubricating oil pan, if the pan is a lubricating oil pan, continues to circulate, even though the filter would block circulation. A bypass valve 86, which is normally closed but responds to increased pressure in the upper chamber 86, is disposed between the upper chamber 16 and the sump 26.

The drain area 80, beneath the base of the sump 26, includes a plug 89 which is used for sampling transmission oil and for draining oil if oil is to be changed between filter changes.

The housing 12 is preferably molded from a composite material such as "Nylon 6®" and, in one embodiment of the invention, may have the filter element 14 affixed thereto so as to be changed and disposed of with the housing 16 which is removed by loosening bolts holding the housing to the transmission via the bolt holes 20.

In another embodiment of the invention, the filter element 14 is detachable from the housing 12 by having the filter element retained on releasable fastening posts 90 which are received in apertures 91 in the flange 62–66 of the filter element 14. With this embodiment, the housing 12 is reused and the filter element 14 is discarded or recycled.

Figure 12:
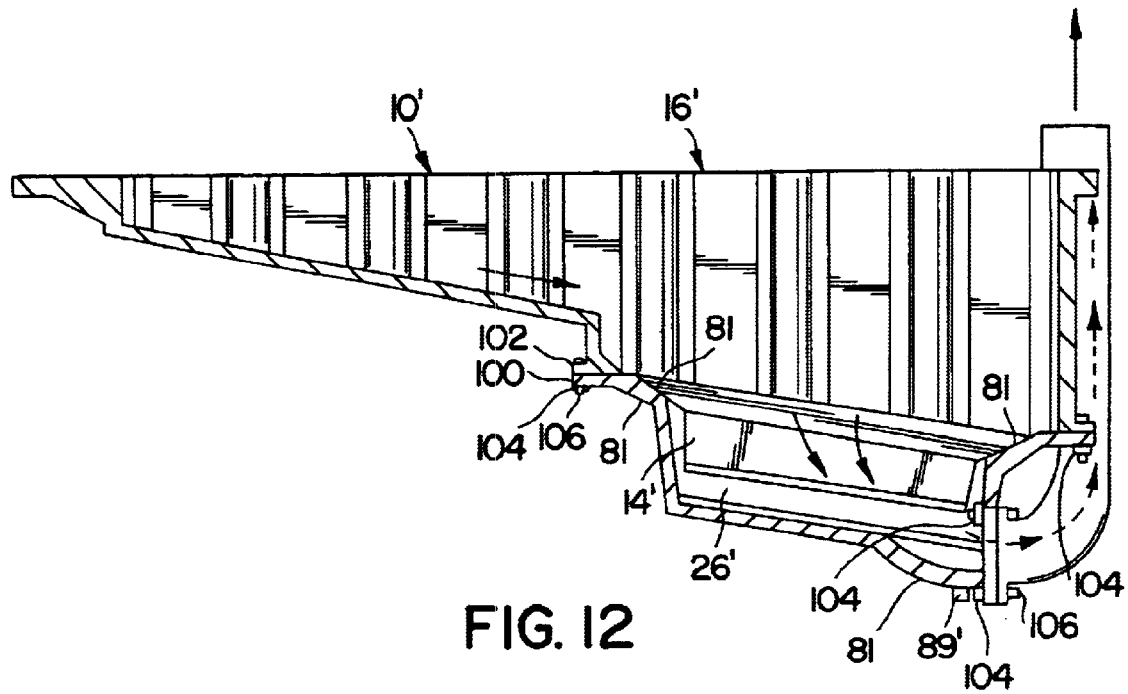
FIG. 12 is a partial cross-section similar to FIG. 10, illustrating an alternative embodiment of the invention with a sump and filter being detachable from the bottom of the oil pan.
Figure 13:
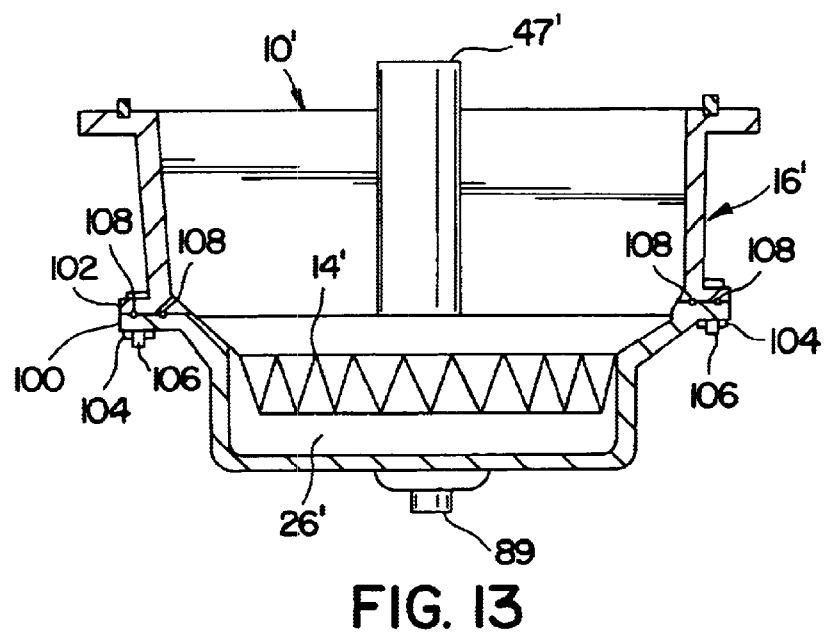
FIG. 13 is a cross-section similar to FIG. 11 of the alternative embodiment of FIG. 12.

In still another embodiment of the invention, as is set forth in FIGS. 12 and 13, a sump 26' is detachable from the housing 16' with the filter element 14', either integral with or readily detachable from the sump so that either the sump and filter are replaced as a unit on the filter is changed and the same sump reused. In both cases, the sump 26' has a peripheral flange 100 which is mounted on a peripheral flange 102 of the housing 16' with nuts 104 threaded on bolts 106 extending from the housing. Seals 108 are disposed between the flanges 100 and 102.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A panel shaped filter element adapted to seat on a sloped peripheral surface of a sump of an oil pan for filtering oil which flows in a selected horizontal direction in the oil pan toward the sump, comprising:

a pleated filter media having first and second edges and first and second ends, the pleated filter media being folded to define only upstream and downstream peaks connected by substantially flat panels, the upstream peaks laying in a first plane to define a filter inlet face and the downstream peaks laying in a second plane to define a filter outlet face; the upstream and downstream peaks having parallel troughs therebetween, the troughs having the terminuses at the first and seconds ends of the filter media and extending in the direction of oil flow when mounted in the oil pan;

a frame for supporting the filter media, the frame having first and second side plate portions for engaging and sealing the terminuses of the troughs; the frame further having laterally extending flanges disposed above the filter inlet face, each flange having an upper first planar surface sloping downwardly and inwardly toward a center of the filter inlet face forming a concavity around the filter inlet face for directing oil to be filtered toward the inlet face and each flange having a lower planar face that is substantially parallel to said upper first planar surface adapted for sealing with the sloped peripheral surface of the sump when the troughs are oriented to extend in the direction of oil flow.

2. The filter element of claim 1, wherein the frame is made of a polyamide plastic material.

3. The filter element of claim 1, wherein two of the flanges extend parallel to the troughs of the pleated filter media and two of the flanges extend perpendicular to the troughs of the pleated filter media.

4. The filter element of claim 3, wherein there is a coupling arrangement for positively sealing the frame to the peripheral surface of the sump, the coupling arrangement comprising an array of openings through the flanges for receiving fastening posts.

5. The filter element of claim 1 further including a coupling arrangement associated with the flange for securing the filter element in the housing.

6. The filter element of claim 5, wherein the coupling arrangement comprises an array of openings through the flanges for receiving fastening posts.

7. In combination, the filter element and oil pan of claim 1, wherein the oil pan is an oil pan for transmission fluid, the oil pan including an upper chamber and a sump between which the filter element is disposed.

8. The combination of claim 7, wherein the sump has an entrance and a land is provided at a sump entrance which land has surfaces that are parallel to the lower lower second and planar faces of the flanges.

9. The combination of claim 8, wherein a gasket is disposed between the land and the lower second planar faces of the flanges.

10. The combination of claim 9, wherein the sump has a base and wherein a return line is disposed proximate the base for returning filtered oil from the oil pan to a transmission.

11. The combination of claim 10, wherein the pan has a plurality of interior surfaces all of which slope toward the sump.

12. The combination of claim 10, wherein the return line is unitary with the pan.

13. The combination of claim 7, wherein the pan has a plurality of interior surfaces all of which slope toward the sump.

14. The combination of claim 13, wherein the sump has a base and a return line is disposed proximate the base for returning filtered oil from the oil pan to a transmission.

15. The combination of claim 13, wherein the sump has an entrance and the sloped peripheral surfaces defines a land provided at the sump entrance which land has surface complementing the lower second planar faces of the flanges.

16. The combination of claim 15, wherein a gasket is disposed between the land and the lower second planar faces of the flanges.

17. The combination of claim 16, wherein the oil pan has an axis which aligns with a direction of travel axis of a vehicle with which the oil pan is used and wherein the peaks and troughs of the filter media extend parallel to the axis.

18. The combination of claim 7, wherein the oil pan has an axis which aligns with a direction of travel axis of a vehicle with which the oil pan is used and wherein the peaks and troughs of the filter media extend parallel to the axis.

19. The combination of claim 7, wherein the sump is separable from the oil pan and further including fastening members for detachably mounting the sump to the oil pan, whereby the filter element is changed without detaching the oil pan.

20. In combination, the filter element and the oil pan of claim 1, wherein the oil pan is an oil pan for engine lubricating oil, the oil pan including an upper chamber and a sump between which the filter element is disposed.

21. The combination of claim 20, wherein the oil pan housing has an axis which aligns with a direction of travel axis of a vehicle with which the oil pan is used wherein the peaks and troughs of the filter media extend parallel to the axis.

22. The combination of claim 21, wherein the pan has a plurality of interior surfaces all of which slope toward the sump.

23. The combination of claim 22, wherein the sump has a base and wherein a return line is disposed proximate the base for returning filtered oil from the oil pan to an engine.

24. The combination of claim 23, wherein the return line is unitary with the pan.

25. The combination of claim 20, wherein the sump is separable from the oil pan and further including fastening members for detachably mounting the sump to the oil pan, whereby the filter element is changed without detaching the oil pan.

26. The filter element of claim 1, wherein the frame is rectangular with one set of parallel sides longer than another set of parallel sides.

27. The filter element of claim 1, wherein the first and second side plates are substantially rectangular and wherein the panels of the filter media are only covered by plates at the edges of the panels.

28. A panel-shaped filter element for filtering transmission oil, the filter element being adapted to be mounted on a peripheral surface of a transmission oil pan spaced from the floor of the pan, the peripheral surface having a selected shape with respect to the direction in which a vehicle mounting the transmission oil pan normally moves, the filter element being used to filter transmission oil which flows in a selected horizontal direction in the oil pan toward the sump, the filter element comprising:

a mounting frame corresponding in shape to the selected shape of the peripheral surface of the sump so as to be adapted to be oriented in a selected direction parallel to the direction in which the vehicle normally moves when the frame is mounted on the peripheral surface, the frame defining an area of a selected shape therewithin;

a pleated filter media suitable for filtering transmission oil, the pleated filter media being mounted within the area defined by the mounting frame, the pleated filter media having pleats defined by peaks and valleys which join panels extending in a selected direction parallel to the selection direction of the frame, the valleys of the filter media all lying in the same plane being positioned below the mounting frame and the peaks rising to at least the bottom of the frame and all lying in the same plane with the panels having a dirty transmission oil side facing toward the mounting frame and a clean transmission oil side facing away from the mounting frame; wherein when the frame is mounted in the peripheral area of the sump, the peaks, valleys and panels of the filter media extend in a direction parallel to the direction in which the vehicle mounting the transmission oil pan moves.

29. The filter element of claim 28 wherein the panels of the filter media extending between the peaks and valleys project downwardly from the frame toward the floor of the sump.

30. The filter element of claim 28 wherein the pleated filter media is a filter media made of a fibrous material.

31. The filter element of claim 28, including a pair of downwardly extending side plates extending perpendicular to the direction in which the peaks, valleys and panels extend, the downwardly extending side panels abutting edges of the filter media to seal the dirty oil side from the clean oil side.

32. A panel-shaped filter element for filtering lubricating oil, the filter element being adapted to be mounted on a peripheral surface of a lubricating oil spaced from the floor of the pan, the peripheral surface having a selected shape with respect to the direction in which a vehicle mounting the lubricating oil pan normally moves, the filter element being used to filter lubricating oil which flows in a selected horizontal direction in the oil pan toward the sump, the filter element comprising:

a mounting frame corresponding in shape to the selected shape of the peripheral surface of the sump so as to be adapted to be oriented in a selected direction parallel to the direction in which the vehicle normally moves when the frame is mounted on the peripheral surface, the frame defining an area of a selected shape therewithin;

a pleated filter media suitable for filtering lubricating oil, the pleated filter media being mounted within the area defined by the mounting frame, the pleated filter media having pleats defined by peaks and valleys which join panels extending in a selected direction parallel to the selection direction of the frame, the valleys of the filter media all lying in the same plane being positioned below the mounting frame and the peaks rising to at least the bottom of the frame and all lying in the same plane with the panels having a dirty lubricating oil side facing toward the mounting frame and a clean lubricating oil side facing away from the mounting frame; wherein when the frame is mounted in the peripheral area of the sump, the peaks, valleys and panels of the filter media extend in a direction parallel to the direction in which the vehicle mounting the lubricating oil pan moves.

33. The filter element of claim 32 wherein the panels of the filter media extending between the peaks and valleys project downwardly from the frame toward the floor of the sump.

34. The filter element of claim 32 wherein the pleated filter media is a filter media made of a fibrous material.

35. The filter element of claim 32, including a pair of downwardly extending side plates extending perpendicular to the direction in which the peaks, valleys and panels extend, the downwardly extending side panels abutting the edges of the filter media to seal the dirty oil side from the clean oil side.

* * * * *